United States Patent
Robert et al.

(10) Patent No.: US 11,703,347 B2
(45) Date of Patent: Jul. 18, 2023

(54) METHOD FOR PRODUCING AN AUTONOMOUS NAVIGATION MAP FOR A VEHICLE

(71) Applicants: SAFRAN ELECTRONICS & DEFENSE, Boulogne Billancourt (FR); VALEO SCHALTER UND SENSOREN GMBH, Bietigheim-Bissingen (DE)

(72) Inventors: Emmanuel Robert, Boulogne Billancourt (FR); Jacques Yelloz, Boulogne Billancourt (FR); Philippe Gougeon, Creteil (FR)

(73) Assignees: Safran Electronics & Defense, Boulogne Billancourt (FR); Valeo Schalter UND Sensoren GMBH, Bietigheim-Bissingen (DE)

( * ) Notice: Subject to any disclaimer, the term of this patent is extended or adjusted under 35 U.S.C. 154(b) by 0 days.

(21) Appl. No.: 16/347,151

(22) PCT Filed: Nov. 2, 2017

(86) PCT No.: PCT/EP2017/078101
§ 371 (c)(1),
(2) Date: May 2, 2019

(87) PCT Pub. No.: WO2018/083200
PCT Pub. Date: May 11, 2018

(65) Prior Publication Data
US 2020/0057451 A1  Feb. 20, 2020

(30) Foreign Application Priority Data
Nov. 2, 2016 (FR) ..................... 16 60599

(51) Int. Cl.
*G01C 21/00* (2006.01)
*G05D 1/00* (2006.01)
*G05D 1/02* (2020.01)

(52) U.S. Cl.
CPC ..... *G01C 21/3815* (2020.08); *G01C 21/3844* (2020.08); *G05D 1/0088* (2013.01); *G05D 1/0274* (2013.01); *G05D 2201/0213* (2013.01)

(58) Field of Classification Search
CPC ............... G05D 1/0274; G05D 1/0088; G05D 2201/0213; G01C 21/32
See application file for complete search history.

(56) References Cited

U.S. PATENT DOCUMENTS 9,188,985 B1 * 11/2015 Hobbs ................. G01C 21/3626
2017/0010616 A1 * 1/2017 Shashua ................. B60W 30/18
(Continued)

FOREIGN PATENT DOCUMENTS

WO   WO 2014/139821 A1   9/2014

*Primary Examiner* — Thomas Ingram
(74) *Attorney, Agent, or Firm* — Muncy, Geissler, Olds & Lowe, P.C.

(57) ABSTRACT

The method of preparing a navigation autonomy map for a vehicle covering a zone including path segments, comprising the following steps: identifying the path segments for which the map needs to be prepared; for each path segment, calculating a primary autonomy index in accordance with at least two distinct functions; and calculating for each path segment a final autonomy index by taking a weighted average of the primary autonomy indices. An autonomy map, an application of the autonomy map, and a vehicle using such an autonomy map.

8 Claims, 3 Drawing Sheets

(56) References Cited

U.S. PATENT DOCUMENTS

| | | | |
|---|---|---|---|
| 2017/0219364 A1* | 8/2017 | Lathrop | G01C 21/3453 |
| 2017/0259832 A1* | 9/2017 | Lathrop | B60W 50/14 |
| 2017/0356746 A1* | 12/2017 | Iagnemma | G01C 21/34 |
| 2017/0356748 A1* | 12/2017 | Iagnemma | G01C 21/34 |
| 2018/0061242 A1* | 3/2018 | Bavar | G01C 21/3407 |
| 2018/0075538 A1* | 3/2018 | Konrardy | G08G 1/096775 |
| 2018/0107216 A1* | 4/2018 | Beaurepaire | B60W 50/08 |
| 2018/0224286 A1* | 8/2018 | Pickering | G01C 21/3453 |

* cited by examiner

METHOD FOR PRODUCING AN AUTONOMOUS NAVIGATION MAP FOR A VEHICLE The present invention provides a method of preparing a navigation autonomy map for a vehicle, a resulting autonomy map, and an application of that map to determining a path.

BACKGROUND OF THE INVENTION

Nowadays, conventional vehicles are very widely provided with navigation systems including map data and capable of performing an itinerary planning algorithm on the basis of that data. Such systems include the global positioning system (GPS), but they are nevertheless not designed, on their own, to allow a vehicle to operate without a driver.

It is also known that a large amount of work is being undertaken for the purpose of enabling vehicles traveling on the road network to navigate autonomously, i.e. without intervention from a driver.

The appearance of autonomy functions in vehicles raises the problem of a risk of those functions failing and of the resulting consequences. Such functions provide solutions to navigating and/or driving the vehicle only if all of the external information that is needed is present and properly processed by the onboard system. Otherwise, they either fail and the driver needs to take over, or else they act erroneously, and takeover by the driver is even more difficult.

Various means exist at present for providing a navigation autonomy function in a vehicle, or at least for contributing to such an autonomy function. The main techniques that exist at present are known as: GPS (mentioned above); light detection and ranging (LIDAR) or laser detection and ranging (LADAR); inertial navigation system (INS); techniques making use of detecting markings on the ground; techniques making use of dedicated signals being transmitted by transmitters arranged in road infrastructure equipment, in particular traffic lights, . . . .

None of those techniques is satisfactory, on its own, for covering an entire road network.

OBJECT OF THE INVENTION

An object of the invention is to propose a method of preparing a navigation autonomy map for a vehicle, which method is reliable over all of the segments of a path in a given zone.

SUMMARY OF THE INVENTION

In order to achieve this object, the invention provides a method of preparing a navigation autonomy map for a vehicle covering a zone including path segments, the method comprising the following steps: identifying the path segments for which the map needs to be prepared; for each path segment, calculating primary autonomy indices in accordance with at least two distinct autonomy functions; and calculating for each path segment a final autonomy index on the basis of the primary autonomy indices.

Thus, by selecting additional autonomy functions adapted to the configuration of the zone under consideration, a final autonomy index is obtained for each segment of the path, which final index presents reliability that is improved compared with any one existing technique. As a result, the autonomy map combines particular map data such as the autonomy indices that serve to increase the safety of autonomous vehicles, e.g. by enabling them to plan paths for which the segments are associated with autonomy indices that are the most favorable for autonomy.

In an advantageous version of the invention, the final autonomy index is calculated by taking a weighted average of the primary autonomy indices and the method includes the following steps: performing a plurality of calculations for each final index with distinct weighting coefficients; comparing the resulting final autonomy indices; and preparing the navigation autonomy map by retaining the weighting for which the lowest final index is the highest of the lowest final indices of the various weightings.

This further improves the accuracy of the resulting navigation autonomy map.

In another advantageous version of the invention, the method includes the following steps: performing a plurality of calculations for each final index with distinct weighting coefficients; comparing the resulting final autonomy indices; and preparing the navigation autonomy map by retaining the highest final autonomy index for each path segment.

In another aspect of the invention, the method includes the steps of: identifying path segments for which the final autonomy indices are less than a predetermined threshold; and of smoothing the immediately adjacent path segments. Preferably, the method includes a prior step of analyzing the configuration of the path segments and of installing equipment adapted to improve the primary autonomy indices.

The invention also provides: a navigation autonomy map for a vehicle covering a zone comprising path segments, wherein, for each path segment, the map includes a final autonomy index obtained by taking a weighted mean of primary autonomy indices in accordance with at least two distinct autonomy functions; and an application of this autonomy map to determining a resulting path by adding autonomy parameters to the various parameters (travel time, toll booths, . . . ) that are presently in use for determining a path.

BRIEF DESCRIPTION OF THE DRAWINGS

Other characteristics and advantages of the invention appear further on reading the following description of a preferred, non-limiting implementation of the invention given with reference to the accompanying figures, in which.

DETAILED DESCRIPTION OF THE INVENTION

With reference to the figures, the method shown comprises a first step 1 of analyzing the configuration of path segments, followed by a second step 2 of selecting autonomy functions. For example, in a city of close-packed structure, comprising buildings that are very close together, and provided with a large amount of marking on the ground and with dedicated transmitters located in urban equipment, the corresponding recognition parameters should be selected, whereas on an open road the GPS autonomy function should be selected.

Thereafter, in a third step 3, primary autonomy indices are calculated followed by a fourth step 4 of calculating final indices by taking a weighted mean of the primary indices. The weighting coefficients correspond to the relative importance of each primary index for the autonomy of the vehicle (e.g. in a given segment, the fact of having accurate ground marking and a high definition map may be more important than the fact of having a visual reference point in line of sight). The weighting coefficients may be determined a priori, or they may be updated periodically or in real time depending on traffic conditions (a weather event such as fog, the presence of an accident or of roadworks). The weighted mean may be a mean that is weighted under constraints (under such circumstances, it is considered that when the primary index is less than a value X, then the coefficient that is associated therewith is equal to 0, whereas when the primary index is greater than the value X, the coefficient is equal to 1). For example, assuming that a law bans autonomous traffic when ground marking is obliterated, then using a weighted mean under constraints makes it possible for the criterion relating to ground marking to be made preponderant over the others when ground marking is absent.

If the resulting final indices do not appear to be sufficiently reliable, then the final indices are preferably calculated once more using a different weighting, followed by a comparison step 5 and a selection step 6, possibly followed by a smoothing step 7, e.g. by using an inertial navigation system.

Figure 1:
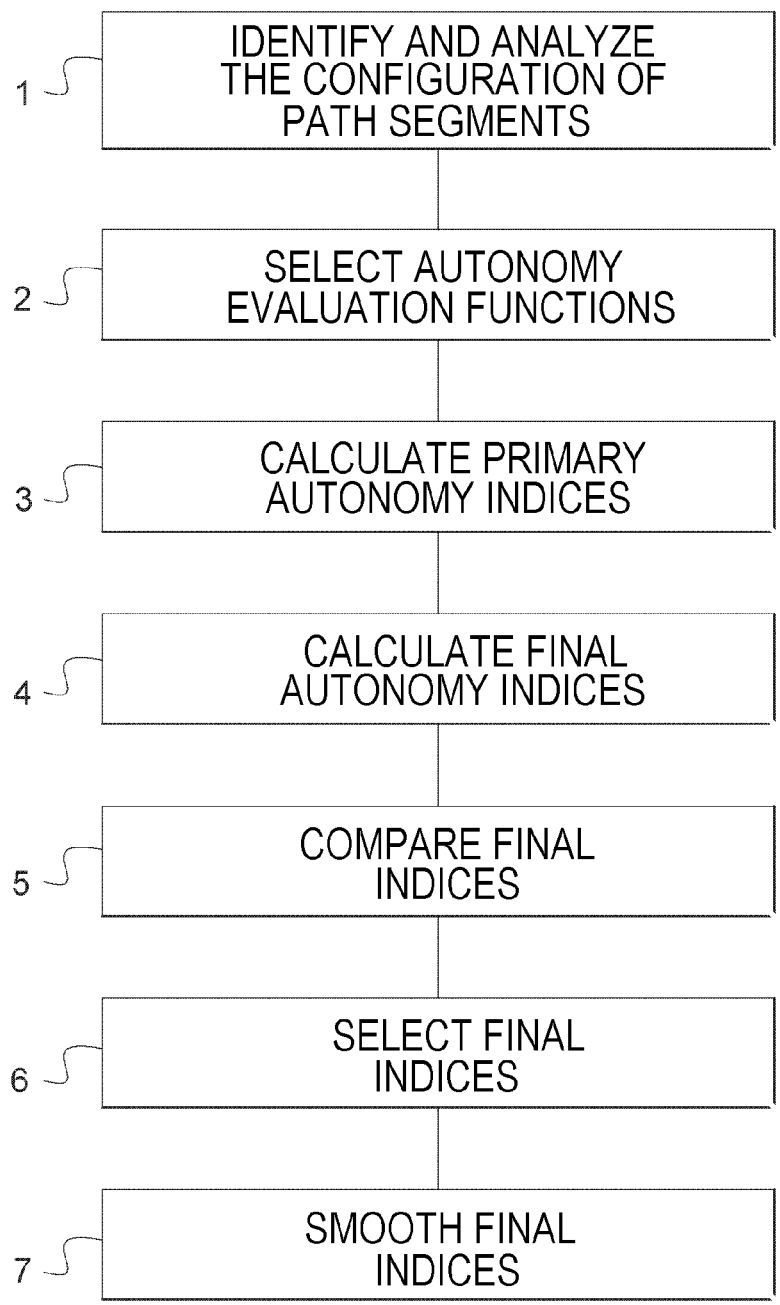
FIG. 1 is a block diagram of the method of the invention.
Figure 2:
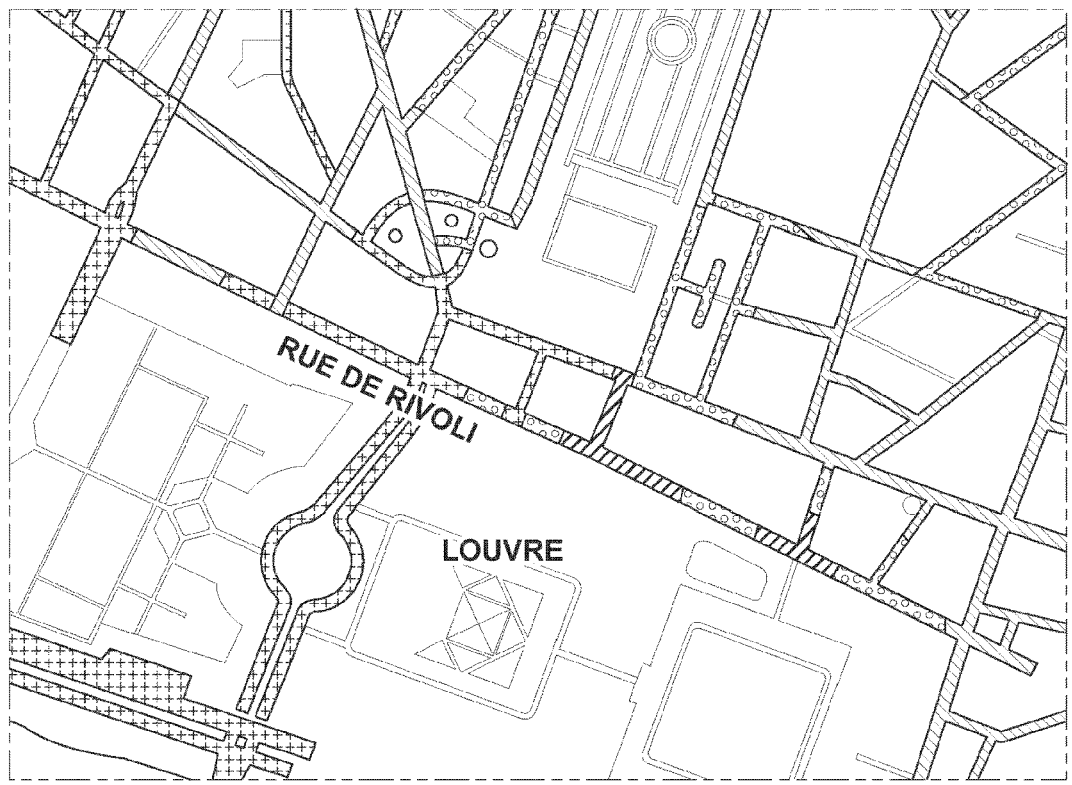
FIG. 2 is a map including primary indices calculated for a first autonomy function.

FIG. 2 shows the results of calculating primary indices for a part of Paris, by using the GPS autonomy function. The value for the primary index is illustrated by four decreasing values using the following signs: + sign; light shading; bold shading; small circles.

Figure 3:
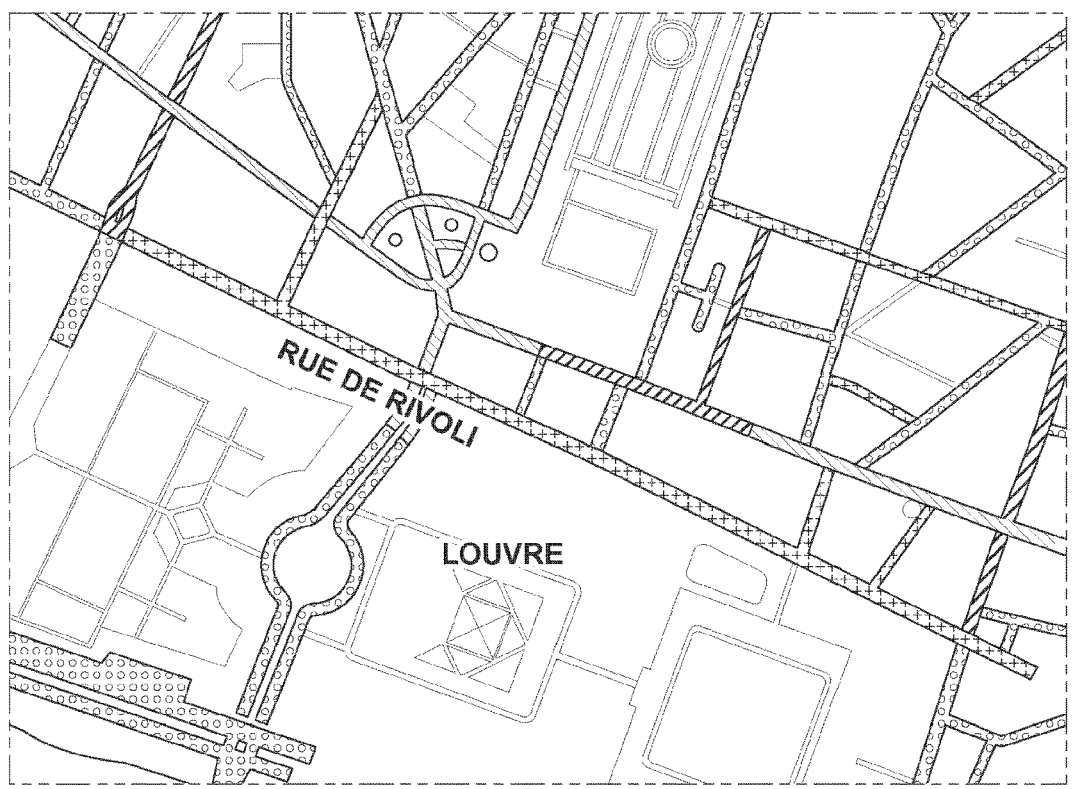
FIG. 3 is a map including primary indices calculated for a second autonomy function.

FIG. 3 shows the result of calculation using the LIDAR autonomy function, with the same signs for representing the indices that are obtained.

Figure 4:
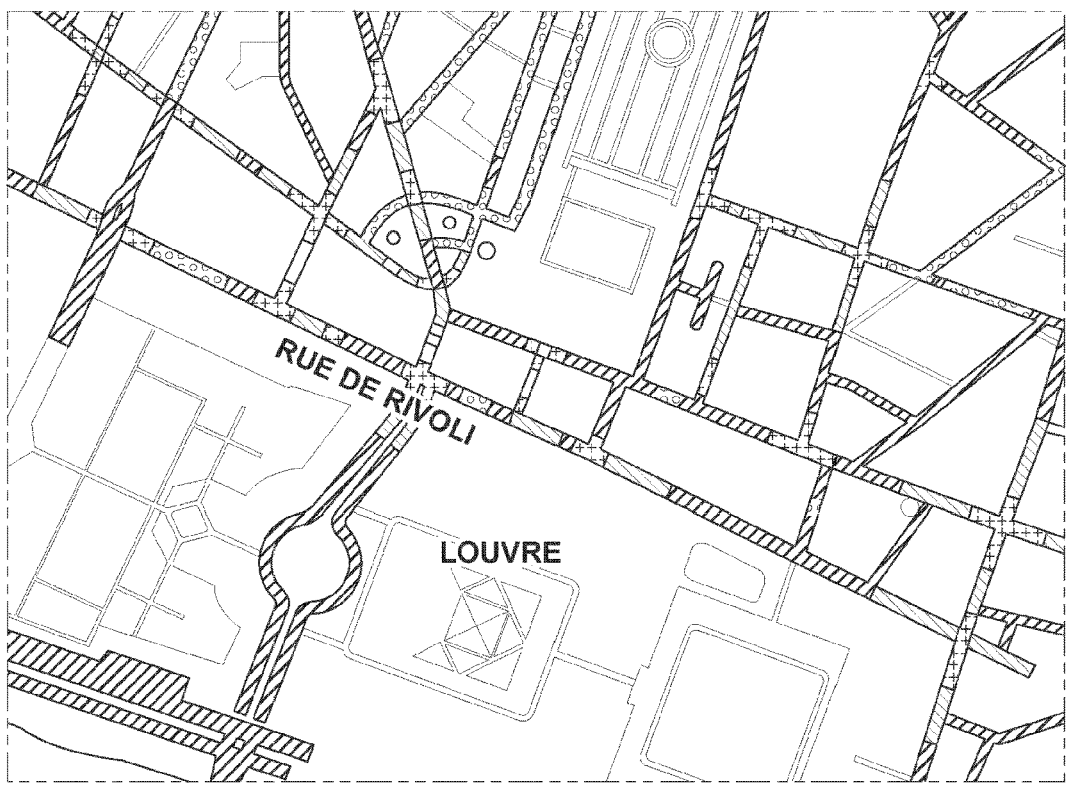
FIG. 4 is a map including primary indices calculated for a third autonomy function.

FIG. 4 shows the result of calculation using the ground marking autonomy function, still with the same signs.

Figure 5:
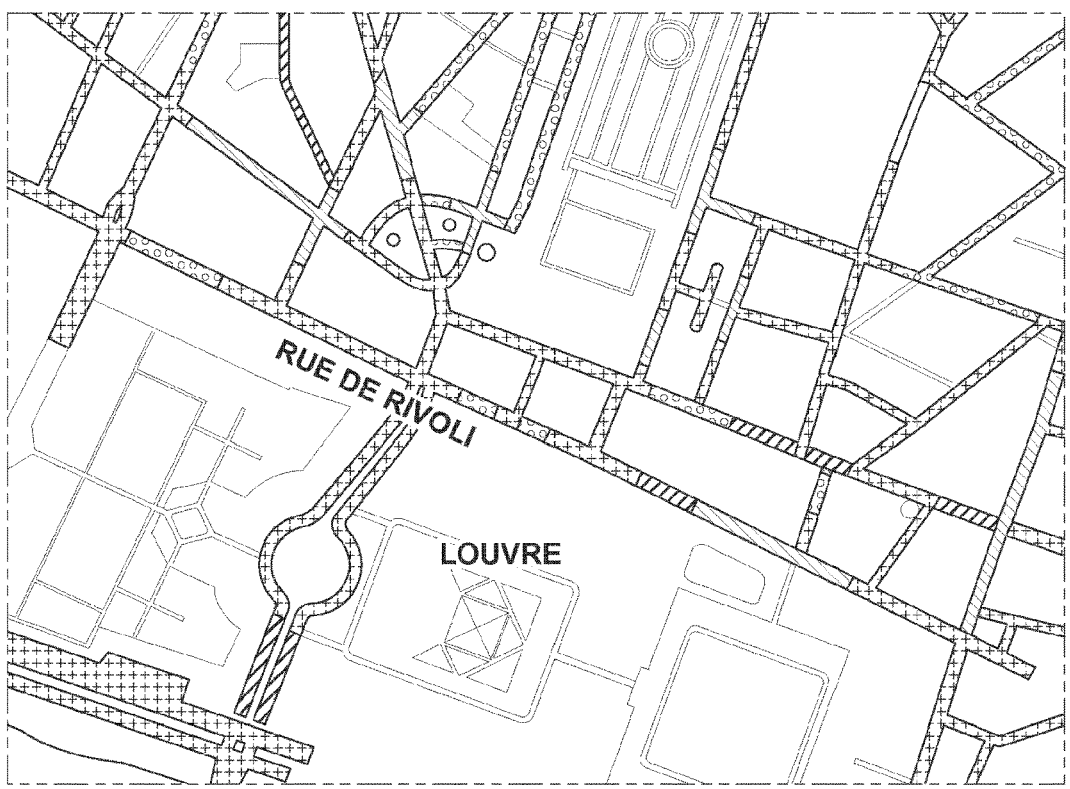
FIG. 5 is a map including final indices, calculated from the primary indices of the above figures.

FIG. 5 shows the result of calculating a weighted mean on the basis of the above three. It can be seen that the quality of the GPS index over a portion of rue de Rivoli is degraded in part by the other autonomy functions. Nevertheless, a correction can be carried out using the INS autonomy function. It should be observed in this context that the quality of the index depends on the quality of the components used. In particular, a good quality INS can make it possible to raise all of the segments of the path to the higher value. The quality of the components associated with the method of the invention thus makes it possible to distinguish between vehicles that are genuinely equipped for autonomous navigation, and vehicles that are autonomous only under determined circumstances.

The autonomous vehicle suitable for performing the method of the invention has an automatic driver unit and a navigation unit. The automatic driver unit is connected to the control members of the vehicle such as the steering system, the engine, the braking system, and also to sensors for detecting the behavior of the vehicle and of the surroundings of the vehicle, and it incorporates calculation means enabling the control members to be driven on the basis of information provided by the sensors so that the vehicle remains on a determined path while complying with traffic regulations. By way of example, the navigation unit has a GPS module and a module for planning itineraries on the basis of map data comprising the autonomy map. The autonomy map is used both by the navigation unit for determining an itinerary depending on the indices for the segments traveled, and by the driver unit that determines, depending on the segments being traveled, which sensors should be given precedence (for example, in a zone where GPS signals are received with poor quality, GPS information should be ignored for driving the vehicle in order to limit any risk that taking such information into account would degrade the accuracy of autonomous driving).

The autonomy maps may advantageously be used by an organization that manages the road network in order to identify segments of the network that need to be improved for autonomous vehicle traffic (by reworking ground signaling, by installing radiofrequency identity (RFID) beacons for delivering information to autonomous vehicles, . . . ).

The autonomy maps may advantageously be used by motor manufacturers to enable them to determine the portions of a network on which their vehicles can operate in autonomous manner and to enable them to improve their vehicles by assisting in identifying which sensors autonomous vehicles need to have in order to enable them to drive autonomously on a larger fraction of the network.

Naturally, the invention is not limited to the implementation described, and variant implementations may be devised without going beyond the ambit of the invention as defined by the claims.

In particular, it can be understood that the autonomy of a vehicle depends on the sensors that are present on the vehicle. Consequently, an autonomy map should be prepared for each model, or indeed each version, of a vehicle. It is also possible to envisage providing organizations that manage the road network on a local scale or a national scale with "global" autonomy maps corresponding to several types or models of autonomous vehicle. For example, a "minimum" autonomy map should be prepared based on the minimum equipment of autonomous vehicles, together with a "maximum" autonomy map based on the maximum equipment of autonomous vehicles.

Instead of using an average, it is possible to calculate the degree of autonomy by using the minimum of all of the criteria for each segment.

The invention claimed is:

1. A method for autonomously navigating and driving, without intervention from a driver, a vehicle traveling in a zone, said vehicle being provided with an onboard system and at least two sensors each sensing external information and providing a navigation autonomy function, the onboard system comprising an automatic driver unit and a navigation unit and said navigation autonomy functions providing solutions to autonomously navigating and driving the vehicle only if all of the external information that is needed is present and properly processed by the onboard system, the navigation unit comprising a module for planning itineraries on the basis of map data comprising an autonomy map prepared in function of the vehicle sensors and covering said zone and comprising path segments, the map comprising for each path segment a final autonomy reliability index calculated by a computer by taking a weighted mean of primary autonomy reliability indices each depending on quality of the sensor and presence of the external information in relation with each of the navigation autonomy functions in each path segment, the weighted mean being calculated with weighting coefficients that correspond to the relative importance of each primary index for the autonomy of the vehicle, the autonomy map being used both by the navigation unit to determine an itinerary as a function of the final indices of the segments traveled, and also by the autopilot to determine which sensors should be given precedence on the basis of the segment traveled.

2. The method according to claim 1, wherein the map is prepared by a computer: identifying the path segments for which the map needs to be prepared; for each path segment, calculating a primary autonomy reliability index for each navigation autonomy function; and calculating for each path segment a final autonomy reliability index on the basis of the primary autonomy reliability indices and wherein the weighted average of the primary autonomy reliability indices is weighted according to the relative importance of each primary autonomy reliability index for the navigation autonomy of the vehicle.

3. The method according to claim 2, further comprising the following steps: performing a plurality of calculations for each final index with distinct weighting coefficients; comparing the resulting final indices; and preparing the navigation autonomy map by retaining the weighting for which the lowest final index is the highest of the lowest final indices of the various weightings.

4. The method according to claim 2, further comprising the following steps: performing a plurality of calculations for each final index with distinct weighting coefficients; comparing the resulting final indices; and preparing the navigation autonomy map by retaining the highest final index for each path segment.

5. The method according to claim 1, further comprising the steps of identifying path segments for which the final autonomy reliability indices are less than a predetermined threshold, and of performing a smoothing operation applied to the immediately adjacent path segments.

6. The method according to claim 1, further comprising a prior step of analyzing the configuration of the path segments and of installing equipment adapted to improve the primary autonomy reliability indices.

7. An autonomous vehicle including an autopilot and a navigation unit; the autopilot comprising a first computer connected to vehicle control members for controlling the movement of the vehicle and to sensors for detecting the behavior of the vehicle and the surroundings of the vehicle, and arranged to drive the control members on the information supplied by the sensors so that the vehicle remains on a determined path in compliance with traffic regulations; the navigation unit and the autopilot being arranged to implement the method of claim 1.

8. A method for autonomously navigating and driving, i.e. without intervention from a driver, a vehicle traveling in a zone, said vehicle being provided with an onboard system and at least two sensors each sensing external information and providing a navigation autonomy function, the onboard system comprising an automatic driver unit and a navigation unit and said navigation autonomy functions providing solutions to autonomously navigating and driving the vehicle only if all of the external information that is needed is present and properly processed by the onboard system, the navigation unit comprising a module for planning itineraries on the basis of map data comprising an autonomy map prepared in function of the vehicle sensors and covering said zone and comprising path segments, the map comprising for each path segment a final autonomy reliability index calculated by a computer on the basis of primary autonomy reliability indices each in relation with one of the navigation autonomy functions.

* * * * *